(12) United States Patent
Potter

(10) Patent No.: US 7,100,704 B2
(45) Date of Patent: Sep. 5, 2006

(54) IMPLEMENT MOUNTING TRAILER

(75) Inventor: Todd K. Potter, Hanover, MN (US)

(73) Assignee: Kolpin Powersports, Inc., Fox Lake, WI (US)

( * ) Notice: Subject to any disclaimer, the term of this patent is extended or adjusted under 35 U.S.C. 154(b) by 0 days.

(21) Appl. No.: 10/937,213

(22) Filed: Sep. 9, 2004

(65) Prior Publication Data

US 2005/0028993 A1 Feb. 10, 2005

Related U.S. Application Data

(63) Continuation-in-part of application No. 10/424,321, filed on Apr. 23, 2003, now Pat. No. 6,796,384.

(51) Int. Cl.
*A01B 59/04* (2006.01)

(52) U.S. Cl. .................. 172/439; 280/461.1; 172/677

(58) Field of Classification Search ............... 172/439, 172/440, 441, 442, 448, 677, 679; 280/460.1, 280/461

See application file for complete search history.

(56) References Cited

U.S. PATENT DOCUMENTS

| | | | |
|---|---|---|---|
| 2,743,117 A | 4/1956 | Hutchings ................. 280/456 |
| 3,255,828 A * | 6/1966 | Abbott ......................... 172/7 |
| 3,583,494 A * | 6/1971 | Thompson et al. ......... 172/285 |
| 3,608,645 A * | 9/1971 | Meiners ..................... 172/491 |
| 4,019,755 A | 4/1977 | Eisenhardt ............. 280/490 A |
| 4,181,181 A | 1/1980 | Old ........................... 172/443 |
| 4,184,757 A | 1/1980 | Kondo ........................ 354/43 |
| 4,519,623 A | 5/1985 | Orthman ................ 280/461 A |
| 5,071,144 A * | 12/1991 | Tayler ........................... 278/5 |
| 5,423,394 A | 6/1995 | Kendle ...................... 180/53.3 |
| 5,531,468 A * | 7/1996 | White ........................ 280/463 |
| 5,707,072 A | 1/1998 | Hopper .................... 280/491.5 |
| 5,746,275 A | 5/1998 | Cross et al. ................ 172/440 |
| 5,829,536 A | 11/1998 | Pigg et al. .................. 172/482 |
| 5,971,082 A | 10/1999 | Satzler ....................... 172/439 |
| 5,975,216 A | 11/1999 | Gibbons ..................... 172/439 |
| 5,988,294 A | 11/1999 | Hubscher .................... 172/453 |
| 6,089,328 A | 7/2000 | Moore et al. ............... 172/447 |
| 6,257,347 B1 * | 7/2001 | Campisi ..................... 172/439 |
| 6,443,236 B1 | 9/2002 | Staude ....................... 172/439 |
| 6,478,094 B1 | 11/2002 | Alexander et al. .......... 172/439 |
| 6,588,513 B1 | 7/2003 | Gustafson ................... 172/439 |
| 2003/0067140 A1 * | 4/2003 | Gunderson .................. 280/444 |

* cited by examiner

*Primary Examiner*—Thomas B. Will
*Assistant Examiner*—Alexandra Pechhold
(74) *Attorney, Agent, or Firm*—Godfrey & Kahn, S.C.

(57) ABSTRACT

An implement support unit for cooperating with an implement-mounting device for an implement for mounting the implement on a trailer unit. Preferably, the support unit is a three point hitch type support unit.

9 Claims, 3 Drawing Sheets

IMPLEMENT MOUNTING TRAILER

CROSS REFERENCE TO RELATED APPLICATIONS

This application is a continuation in part of application Ser. No. 10/424,321, filed Apr. 23, 2003 now U.S. Pat. No. 6,796,384 by Todd Potter and entitled Implement Mounting Fixture.

BACKGROUND OF THE INVENTION

1. Field of the invention

The present invention relates to the field of implement-mounting fixtures.

2. Background of the Prior Art

Implements, of which farm implements are one example, are used to plow, plant crops, haul materials, and perform a variety of other useful tasks. A work machine carries, deploys, and sometimes powers the implement. Trucks, tractors, all-terrain vehicles (ATVs), maintenance vehicles, and the like are examples of work machines available that typically use implements.

An implement-mounting device is a structure forming a part of an implement that allows the implement to be mounted for use on a work machine.

A work machine is usually supplied with a structure called an implement attachment unit compatible with implement-mounting devices. This allows a variety of implements to be mounted on a work machine in a similar way. An implement attachment unit and a compatible implement-mounting device will be collectively referred to hereafter as a mounting interface.

The square tunnel hitch receiver for pulling trailers and other wheeled implements is a type of implement attachment unit that is now relatively standardized. A bracket attaches a square box beam to the rear or front of the work machine with the box beam tunnel approximately parallel to the work machine centerline. A square hitch bar sized to fit closely within the tunnel has a flat, horizontal plate that projects from the end of the square bar. Aligned holes in the box beam and hitch bar allow a pin to strongly hold the bar in the tunnel. Removing the pin allows the hitch bar removal to prevent the hitch bar from damaging other vehicles, and allows replacement by other hitch bars. The standard trailer hitch attaches to a trailer ball bolted through a vertical hole in the plate.

The square tunnel hitch receiver is suitable for pulling trailers and other wheeled implements but is usually unsuitable for other types of implements. For example, many types of implements, such as scrapers, mowers, etc. must be lifted from the ground during use and transporting.

A problem with many prior art mounting interfaces that can attach non-trailer type implements to work machines is that they often are unique or proprietary. This results in an implement-mounting device compatible with one type of work machine, but incompatible with other work machines. Other mounting interfaces require bolting at multiple points to attach an implement to the work machine, which is inconvenient and time-consuming.

The three-point hitch is an existing design for a mounting interface. The implement attachment unit of a three-point hitch comprises a central upper arm carried on to the work machine and two lower outboard arms. The upper arm attaches to an upper hitch point forming a part of the implement-mounting device. The two lower arms attach to two lower outboard points on the implement forming a further part of the implement-mounting device.

Typically, the two lower arms are powered to rotate upwards to lift the implement away from the ground. Gravity lowers the implement to ride across the ground when the two lower arms are rotated downward. Where necessary to properly operate an implement such as an aerator or scraper, the lower arms can be powered to force the implement into the ground as well. The upper arm prevents the implement from tilting forward or backward onto the ground when lifted by the lower arms.

The three-point hitch has been in use for 60 years for farm tractors, and has become a de facto standard for tractor mounting interfaces. A detached implement is attached to a tractor having a compatible three-point hitch type implement attachment unit by attaching the three bars of the implement attachment unit to the implement-mounting device on the implement.

Of course, the implement attachment unit of a three-point hitch must be compatible with the implement-mounting device of an implement, to mount that implement. Further, many different types of three-point hitch implement interfaces exist that are incompatible with each other. Thus, one problem with existing three-point hitches as well as other mounting interfaces, is that of incompatibility among manufacturers' product lines.

SUMMARY OF THE INVENTION

The present invention provides trailer-mounted fixture for mounting an implement. In its broadest form, the fixture comprises a frame having a leading side and a trailing side. At least two wheels are mounted on the frame, preferably by an axle. A tongue is attached to the frame and projects from the leading side of the frame. The tongue is to be conventionally attached to a trailer hitch on a work machine. A hitch support unit is mounted on the trailing side of the frame. Preferably the hitch support unit is a three-point hitch support unit.

Because the hitch support unit projects behind the wheels, an implement mounted on the hitch support unit applies negative (upward) force to the end of the tongue, which may affect the traction of the work machine to which the tongue is attached. The tongue may include a bracket for mounting a weight near the end of the tongue. This weight counterbalances the implement to provide positive tongue weight.

DETAILED DESCRIPTION OF THE INVENTION

Figure 1:
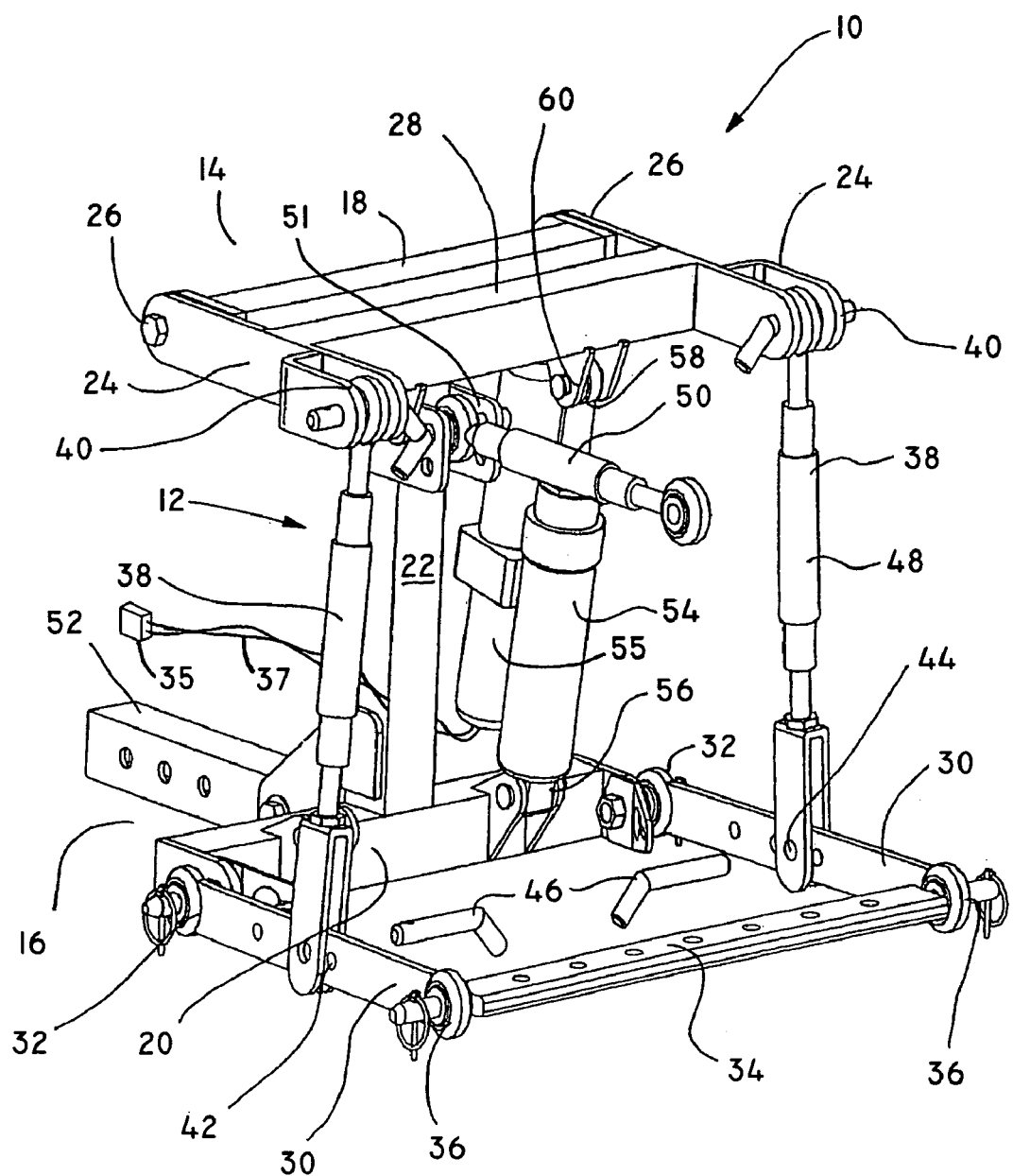
FIG. 1 is a perspective view of a first embodiment of the invention.

FIG. 1 illustrates a first embodiment of an implement attachment unit 10 for mounting an implement to a work machine.

The implement attachment unit 10 has a frame 12 having an upper portion 14 and a lower portion 16. The frame 12 has an upright member 22 that connects to an upper crossbar 18 in the upper portion 14 of the frame 12 and a lower crossbar 20 in the lower portion 16 of the frame 12. The upper crossbar 18 and lower crossbar 20 are generally parallel to each other and perpendicular to the upright member 22.

A pair of upper lift arms 24 extends from the upper portion 14 of the frame 12. The upper lift arms 24 have a first end 26 pivotally connected to the upper portion 14 of the frame 12. The upper lift arms 24 are connected to opposing sides of the upper portion 14 of the frame 12. The upper lift arms 24 extend outwardly from the frame 12, generally parallel to one another.

A transverse beam 28 extends between the upper lift arms 24. The transverse beam 28 is connected to the upper lift arms 24 at a position outwardly spaced from the first end of the upper lift arms, between the first end 26 and second end 40. The transverse beam 28 is fixedly connected to each of the upper lift arms 24 such that a force applied to the transverse beam 28 will cause the upper lift arms 24 to pivot about the first end 26.

A pair of lower lift arms 30 extends from a lower portion 16 of the frame 12. The lower lift arms 30 have a first end 32 pivotally connected to opposing ends of the lower crossbar 20 of the frame 12. The lower lift arms 30 extend outwardly from the lower portion 16 of the frame 12, generally parallel to each other. An implement 34 may be positioned between the outwardly extending second ends 36 of each of the lower lift arms 30.

An adjustable lift arm 38 extends from each of the upper lift arms 24 to a corresponding lower lift arm 30. The adjustable lift arms 38 are pivotally connected to a second, outwardly extending end 40 of the upper lift arms 24. The adjustable lift arms 38 are adjustably connectable to the lower lift arms 30. The lower lift arms 30 have a series of apertures 42 along a length of the lower lift arm 30. The adjustable lift arms 38 have a mating aperture 44 that is selectively alignable with any of the series of apertures 42 on the lower lift arm 30. The adjustable lift arms 38 are connected to the lower lift arms 30 by extending a pin 46 through the mating aperture 44 and corresponding aperture 42 of the lower lift arms 30. The body 48 of the adjustable lift arms 38 may include a ball swivel and clevis.

A link arm 50 is pivotally connected to the frame 12, and extends therefrom for linking to an implement. The link arm 50 is able to extend generally outwardly in the direction of the upper lift arms 24 and lower lift arms 30. The link arm 50 may pivot within a range extending from the lower portion 16 of the frame 12 to an upper portion 14 of the frame 12.

A hitch tube 52 extends from the frame 12, in a direction opposite that in which the upper lift arms 24 and lower lift arms 30 extend. The hitch tube 52 is connected to the lower portion 16 of the frame 12. The hitch tube 52 allows the implement mounting fixture 10 to be mounted to a work machine by receiving a hitch (not shown) from the work machine. The hitch tube 52 may have adjustable or additional components to allow the hitch tube 52 to mate with a work machine. The hitch tube 52 allows the implement mounting fixture 10 to mount to the work machine at a single point, allowing the implement mounting fixture 10 to be mounted to a wide variety of work machines, and to be mounted on either the front or rear of the work machines. The hitch tube 52 may be a two inch hitch tube. Adjustable or additional components may include a 1¼ inch hitch bar, and a pair of ⅜" spacers, but are not limited thereto.

A hydraulic cylinder 54 extends from the frame 12 to the transverse beam 28. The hydraulic cylinder 54 has a first end 56 connected to the lower portion 16 of the frame 12. The hydraulic cylinder 54 has a second end 58 connected to the transverse beam 28. A connecting member 60 connects the hydraulic cylinder 54 to the transverse beam 28. The connecting member 60 may include a bracket, or other such mechanical connection. The hydraulic cylinder 54 is selectively positionable on the frame 12. It is contemplated that when the implement-mounting fixture 10 is mounted on a work machine the hydraulic cylinder 54 be positioned on a side of the frame 12 opposite an exhaust system of the work machine.

A pump assembly 55 controls operation of cylinder 54. Assembly 55 includes an electric motor that operates a hydraulic pump. An electrical cable 37 has a connecting plug 35 that allows cable 37 to be connected to a lift control and a source of electrical power on the work machine.

The use of hydraulics provides a lifting and downward force in operation. The hydraulic cylinder 54 may provide a predetermined force, either generally upwardly or generally downwardly upon the transverse beam 28, causing the upper lift arms 24 to pivot about the upper portion 14 of the frame. This force results in a corresponding translation of force to the lower lift arms 30 via the adjustable lift arms 38 connected thereto.

Figure 2:
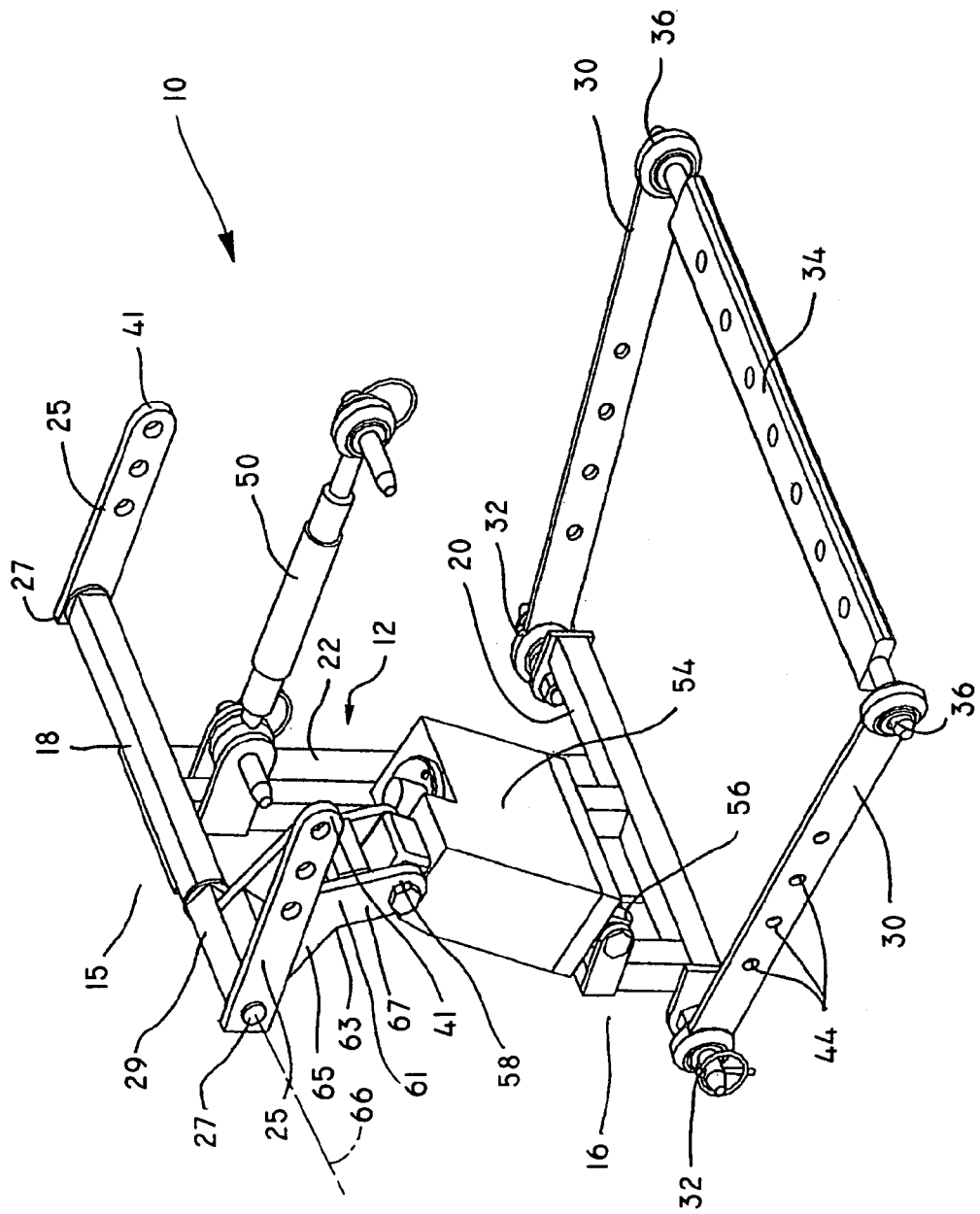
FIG. 2 is a perspective view of a second embodiment of the invention.

FIG. 2 illustrates a second embodiment of the present invention of an implement-mounting fixture for mounting an implement to a work machine.

The implement-mounting fixture 10 has a frame 12 having an upper portion 15 and a lower portion 16. A transverse beam 29 extends through the upper portion 15 of the frame 12. The transverse beam 29 defines an axis 66 about which the transverse beam 29 is able to rotate while being maintained within the upper portion 15 of the frame 12.

A pair of upper lift arms 25 is connected to opposing ends of the transverse beam 29. The pair of upper lift arms 25 has a first end 27 fixedly connected to the transverse beam 29 such that when the transverse beam 29 is rotated about the axis 66 the pair of upper lift arms 25 will likewise rotate.

A connecting member 61 extends from the transverse beam 29, perpendicular to the axis 66. The connecting member 61 has an angle point 63 such that it extends outwardly from the transverse beam 29 for a predetermined distance and then angles for a predetermined distance, forming a perpendicular section 65, and an angled section 67.

A hydraulic cylinder 54 extends from the frame 12 to the transverse beam 29. The hydraulic cylinder 54 has a first end 56 connected to the lower portion 16 of the frame 12. The hydraulic cylinder 54 has a second end 58 connected to the transverse beam 29, via the connecting member 61. The second end 58 of the hydraulic cylinder 54 is connected to the angled section 67 of the connecting member 61.

The hydraulic cylinder 54 may provide a predetermined force, either generally upwardly or generally downwardly upon the connecting member 61, causing the corresponding rotation of the transverse beam 29. The rotation of the transverse beam 29 causes the upper lift arms 25 to rotate with respect to the upper portion 15 of the frame.

As discussed with reference to FIG. 1, the application of a force upon the upper lift arms 25 results in a corresponding translation of force applied to the lower lift arms 30 via the adjustable lift arms 38 connected thereto.

The embodiment of FIG. 2 has a pair of lower lift arms 30 extending from the lower portion 16 of the frame 12, and a pair of adjustable lift arms 38 extending between the upper lift arms 25 and lower lift arms 30. A link arm 50 is pivotally connected to the frame 12. A hitch tube 52 is connected to the opposite side of the frame 12. These elements are described in detail in FIG. 1.

Figure 3:
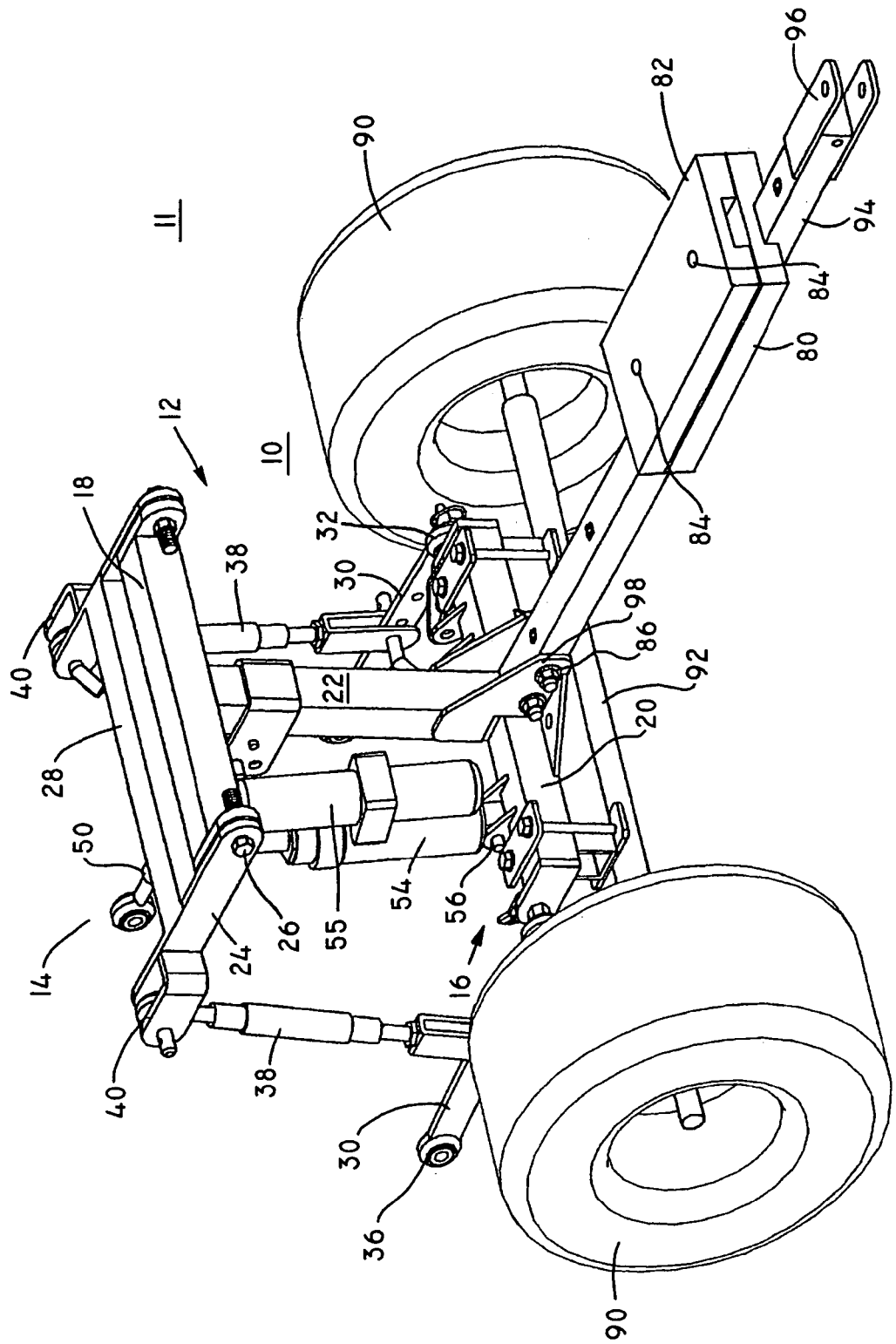
FIG. 3 is a perspective view of a trailer-mounted embodiment of the invention.

FIG. 3 shows an embodiment of the invention in the form of a trailer unit 11. Many of the elements of the implement attachment unit 10 shown in FIG. 3 are similar to those in FIGS. 1 and 2, and these have the same reference numbers.

Frame 12 is mounted by welding or clamping on an axle 92 that has a conventional trailer wheel 90 mounted for rotation at each end. Frame 12 carries the implement attachment unit 10 at a trailing side of frame 12. A tongue 94 is attached by fasteners 86 to a bracket 98 forming a part of a leading side of frame 12. Tongue 94 thus projects from the leading side of frame 12. Tongue 94 has a conventional connector element 96 for attaching tongue 94 to a work machine. In this way, the entire assembly may be pulled by a work machine.

The implement attachment unit 10 preferably is designed to replicate the functionality and dimensions of the implement attachment unit 10 shown in FIGS. 1 and 2, but in the form of a trailer to be drawn by a work machine. Since most work machines have a hitch to which connector element 96 can be attached, this allows nearly every work machine to carry and deploy any implement having an implement-mounting device compatible with the implement attachment unit 10.

A potential problem with a trailer-mounted implement attachment unit 10 is the negative tongue force that the weight of an implement may generate (i.e., upwardly-directed force). To address this problem, axle 92 should as much as possible be placed in substantial vertical alignment with the implement attachment unit 10 as shown in FIG. 3. This minimizes the lever arm created by an implement carried on attachment unit 10, reducing negative tongue force.

A further solution to the problem of negative tongue force is to mount weights 80 and 82 on tongue 94 to counterbalance the implement weight. Weights 80 and 82 are detachably mounted on the end of tongue 94 near the connector 96 by pins 84 comprising brackets attached to tongue 94 near connector element 96. Weights 80 and 82 may have any suitable value to provide sufficient positive tongue 92 force weight.

Weights 80 and 82 may be in the range of 20 to 40 lbs. each, sufficient to adequately weight the tongue 94, and at the same time not so heavy that a person of normal strength has difficulty in mounting the weights. Heavier or lighter weights 80 and 82 and the number used may depend on the weight and configuration of the implement carried by attachment unit 10.

What is claimed is:

1. An implement carrier comprising:
    a) a frame having a leading side, a bottom, and a trailing side;
    b) an axle mounted on the frame, and having two ends;
    c) a wheel mounted a each end of the axle;
    d) a tongue attached to the frame and projecting from the leading side, for attachment to a trailer hitch on a work machine; and
    e) an implement attachment unit mounted on the trailing side of the frame to place the axle in substantial vertical alignment with the implement attachment unit; and
    f) a linear actuator mounted in substantially vertical orientation between the frame and the implement attachment unit.

2. The implement carrier of claim 1, including at least one mechanical link connecting the linear actuator to the implement attachment unit.

3. The implement carrier of claim 2, wherein the mechanical link includes at least one pivoting upper lift arm rotating through a horizontal orientation.

4. The implement carrier of claim 3, including at least one substantially vertically oriented lift bar arm connecting the upper lift arm to the implement attachment unit.

5. The apparatus of claim 1, where the linear actuator is in substantially vertical alignment with the axle.

6. The implement carrier of claim 5 including at least one mechanical link connecting the linear actuator to the implement attachment unit.

7. The implement carrier of claim 6, wherein the mechanical link includes at least one pivoting upper lift arm rotating through a horizontal orientation.

8. The implement carrier of claim 7, including at least one substantially vertical lift arm connecting the upper lift arm to the implement attachment unit.

9. The implement carrier of claim 1, wherein an element of the implement attachment unit is attached to a bracket directly mounted on the axle.

* * * * *